United States Patent
Brundage et al.

(10) Patent No.: US 7,249,257 B2
(45) Date of Patent: *Jul. 24, 2007

(54) DIGITALLY WATERMARKED MAPS AND SIGNS AND RELATED NAVIGATIONAL TOOLS

(75) Inventors: Trent J. Brundage, Tigard, OR (US); Neil Lofgren, White Salmon, WA (US)

(73) Assignee: Digimarc Corporation, Beaverton, OR (US)

( * ) Notice: Subject to any disclaimer, the term of this patent is extended or adjusted under 35 U.S.C. 154(b) by 832 days.

This patent is subject to a terminal disclaimer.

(21) Appl. No.: 09/833,013

(22) Filed: Apr. 10, 2001

(65) Prior Publication Data

US 2002/0147910 A1  Oct. 10, 2002

(51) Int. Cl.
*H04L 9/00* (2006.01)
*H04K 1/00* (2006.01)
*G06F 7/00* (2006.01)

(52) U.S. Cl. .................... 713/176; 380/258; 707/104.1
(58) Field of Classification Search ................ 713/176; 283/35; 382/278
See application file for complete search history.

(56) References Cited

U.S. PATENT DOCUMENTS

| | | | |
|---|---|---|---|
| 4,084,241 A | 4/1978 | Tsumura | |
| 4,504,910 A | 3/1985 | Araki et al. | |
| 4,631,678 A | 12/1986 | Angermiiller et al. | |
| 5,113,445 A | 5/1992 | Wang | |
| 5,214,757 A | 5/1993 | Mauney et al. | 395/161 |
| 5,329,108 A * | 7/1994 | Lamoure | 235/494 |
| 5,385,371 A | 1/1995 | Izawa | 283/34 |
| 5,502,576 A | 3/1996 | Ramsay et al. | |
| 5,664,018 A | 9/1997 | Leighton | 380/54 |
| 5,764,770 A | 6/1998 | Schipper et al. | |
| 5,799,082 A | 8/1998 | Murphy et al. | |
| 5,812,962 A | 9/1998 | Kovac | |
| 5,822,436 A | 10/1998 | Rhoads | |
| 5,825,892 A | 10/1998 | Braudaway et al. | 380/51 |
| 5,848,373 A * | 12/1998 | DeLorme et al. | 701/200 |
| 5,861,841 A | 1/1999 | Gildea et al. | 342/357 |
| 5,889,868 A | 3/1999 | Moskowitz et al. | 380/51 |
| 5,889,898 A | 3/1999 | Koren et al. | 385/9 |

(Continued)

FOREIGN PATENT DOCUMENTS

EP  0 947 953 A2  10/1999

(Continued)

OTHER PUBLICATIONS

U.S. Appl. No. 09/571,422, filed May 15, 2000, Rhoads et al.

(Continued)

*Primary Examiner*—Nasser Moazzami
*Assistant Examiner*—Pramila Parthasarathy (57) ABSTRACT

Maps and signs are embedded with plural-bit data in the form of digital watermarks. In one embodiment, the plural-bit data includes location information with respect to a map. A handheld reading device extracts the location information from the map. The reading device then compares the location information with a physical location of the device. Feedback is provided to help a device user to correlate the map location with the physical location. In another embodiment, signs are watermarked to provide navigational and informational aids. The watermarks may include unique identifiers, which allow database lookup of related information.

10 Claims, 4 Drawing Sheets

U.S. PATENT DOCUMENTS

| | | | |
|---|---|---|---|
| 5,901,178 A | 5/1999 | Lee et al. | |
| 5,919,730 A | 7/1999 | Gasper et al. | |
| 5,958,051 A | 9/1999 | Renaud et al. | |
| 5,964,821 A | 10/1999 | Brunts et al. | 701/201 |
| 5,987,136 A | 11/1999 | Schipper et al. | |
| 5,990,826 A | 11/1999 | Mitchell | 342/357.06 |
| 5,995,681 A | 11/1999 | Lee et al. | |
| 6,005,936 A | 12/1999 | Shimizu | |
| 6,021,406 A * | 2/2000 | Kuznetsov | 707/6 |
| 6,031,914 A | 2/2000 | Tewfik et al. | |
| 6,098,057 A | 8/2000 | Dlugos | |
| 6,122,403 A | 9/2000 | Rhoads | 382/233 |
| 6,130,741 A * | 10/2000 | Wen et al. | 355/40 |
| 6,175,639 B1 | 1/2001 | Satoh et al. | |
| 6,181,802 B1 | 1/2001 | Todd | |
| 6,185,312 B1 | 2/2001 | Nakamura et al. | |
| 6,202,065 B1 * | 3/2001 | Wills | 707/5 |
| 6,243,480 B1 | 6/2001 | Zhao et al. | |
| 6,246,777 B1 | 6/2001 | Agarwal et al. | |
| 6,249,226 B1 | 6/2001 | Harrison et al. | |
| 6,263,438 B1 | 7/2001 | Walker et al. | |
| 6,282,362 B1 * | 8/2001 | Murphy et al. | 386/46 |
| 6,289,453 B1 | 9/2001 | Walker | |
| 6,301,360 B1 | 10/2001 | Bocionek et al. | 380/28 |
| 6,310,956 B1 | 10/2001 | Morito et al. | |
| 6,311,214 B1 | 10/2001 | Rhoads | |
| 6,320,829 B1 | 11/2001 | Matsumoto et al. | |
| 6,324,573 B1 | 11/2001 | Rhoads | |
| 6,332,149 B1 | 12/2001 | Warmus et al. | |
| 6,332,193 B1 | 12/2001 | Glass et al. | |
| 6,341,350 B1 | 1/2002 | Miyahara et al. | |
| 6,343,138 B1 | 1/2002 | Rhoads | |
| 6,351,439 B1 | 2/2002 | Miwa et al. | |
| 6,401,206 B1 | 6/2002 | Khan et al. | |
| 6,408,082 B1 | 6/2002 | Rhoads et al. | |
| 6,408,331 B1 | 6/2002 | Rhoads | |
| 6,411,725 B1 | 6/2002 | Rhoads | |
| 6,427,020 B1 | 7/2002 | Rhoads | |
| 6,493,514 B1 | 12/2002 | Stocks et al. | |
| 6,496,802 B1 | 12/2002 | van Zoest et al. | |
| 6,498,984 B2 | 12/2002 | Agnew et al. | |
| 6,504,571 B1 * | 1/2003 | Narayanaswami et al. | 348/231.99 |
| 6,505,160 B1 | 1/2003 | Levy et al. | |
| 6,512,835 B1 | 1/2003 | Numao et al. | |
| 6,522,770 B1 | 2/2003 | Seder et al. | |
| 6,532,541 B1 | 3/2003 | Chang et al. | |
| 6,614,914 B1 | 9/2003 | Rhoads | |
| 6,636,249 B1 | 10/2003 | Rekimoto | |
| 6,664,976 B2 | 12/2003 | Lofgren | |
| 6,711,497 B1 * | 3/2004 | Winter et al. | 701/208 |
| 6,748,362 B1 * | 6/2004 | Meyer et al. | 704/500 |
| 6,769,228 B1 | 8/2004 | Mahar | |
| 6,783,069 B1 | 8/2004 | Hecht et al. | |
| 6,829,430 B1 | 12/2004 | Ashizaki et al. | |
| 6,847,883 B1 | 1/2005 | Walmsley et al. | |
| 6,993,152 B2 | 1/2006 | Patterson et al. | |
| 7,027,612 B2 | 4/2006 | Patterson et al. | |
| 7,042,470 B2 | 5/2006 | Rhoads et al. | |
| 7,061,510 B2 | 6/2006 | Rhoads | |
| 7,084,903 B2 | 8/2006 | Narayanaswami et al. | |
| 7,088,843 B2 | 8/2006 | Pelly | |
| 7,098,931 B2 | 8/2006 | Patterson et al. | |
| 7,099,492 B2 | 8/2006 | Rhoads | |
| 7,111,168 B2 | 9/2006 | Lofgren et al. | |
| 2001/0001854 A1 | 5/2001 | Schena et al. | |
| 2001/0019611 A1 | 9/2001 | Hilton | |
| 2001/0022667 A1 | 9/2001 | Yoda | |
| 2001/0023421 A1 | 9/2001 | Numao et al. | |
| 2001/0026377 A1 | 10/2001 | Ikegami | |
| 2001/0026616 A1 | 10/2001 | Tanaka | |
| 2001/0026629 A1 | 10/2001 | Oki | |
| 2001/0030759 A1 | 10/2001 | Hayashi et al. | |
| 2001/0031064 A1 | 10/2001 | Donescu et al. | |
| 2001/0031066 A1 * | 10/2001 | Meyer et al. | 382/100 |
| 2001/0033674 A1 | 10/2001 | Chen et al. | |
| 2001/0034835 A1 | 10/2001 | Smith | |
| 2001/0039546 A1 * | 11/2001 | Moore et al. | 707/10 |
| 2001/0046307 A1 | 11/2001 | Wong | |
| 2001/0051964 A1 | 12/2001 | Warmus et al. | |
| 2002/0001395 A1 | 1/2002 | Davis et al. | |
| 2002/0002679 A1 | 1/2002 | Murakami et al. | |
| 2002/0006212 A1 | 1/2002 | Rhoads et al. | |
| 2002/0009209 A1 | 1/2002 | Inoue et al. | |
| 2002/0019940 A1 * | 2/2002 | Matteson et al. | 713/184 |
| 2002/0044690 A1 | 4/2002 | Burgess | |
| 2002/0046178 A1 | 4/2002 | Morito et al. | |
| 2002/0059520 A1 | 5/2002 | Murakami et al. | |
| 2002/0069370 A1 | 6/2002 | Mack | |
| 2002/0080396 A1 | 6/2002 | Silverbrook | |
| 2002/0095586 A1 | 7/2002 | Doyle et al. | |
| 2002/0095601 A1 | 7/2002 | Hind et al. | |
| 2002/0122564 A1 | 9/2002 | Rhoads et al. | |
| 2002/0124171 A1 | 9/2002 | Rhoads | |
| 2002/0124173 A1 | 9/2002 | Stone | |
| 2002/0135600 A1 | 9/2002 | Rhoads | |
| 2002/0136531 A1 | 9/2002 | Harradine | |
| 2002/0147910 A1 | 10/2002 | Brundage et al. | |
| 2002/0159765 A1 | 10/2002 | Maruyama et al. | |
| 2002/0168069 A1 | 11/2002 | Tehranchi et al. | |
| 2002/0191810 A1 | 12/2002 | Fudge et al. | |
| 2002/0191856 A1 | 12/2002 | Umeda et al. | |
| 2003/0011684 A1 | 1/2003 | Narayanaswami | |
| 2003/0012562 A1 | 1/2003 | Lawandy et al. | |
| 2003/0032033 A1 | 2/2003 | Anglin et al. | |
| 2003/0040326 A1 | 2/2003 | Levy et al. | |
| 2003/0048908 A1 | 3/2003 | Hamilton | |
| 2003/0069693 A1 | 4/2003 | Snapp et al. | |
| 2003/0074556 A1 | 4/2003 | Chapman et al. | |
| 2003/0083098 A1 | 5/2003 | Yamazaki et al. | |
| 2003/0090690 A1 | 5/2003 | Katayama et al. | |
| 2003/0215110 A1 | 11/2003 | Rhoads et al. | |
| 2004/0005078 A1 | 1/2004 | Tillotson | |
| 2004/0046774 A1 | 3/2004 | Rhoads | |
| 2004/0162981 A1 | 8/2004 | Wong | |
| 2004/0201676 A1 | 10/2004 | Needham | |
| 2004/0221244 A1 | 11/2004 | Baldino | |
| 2005/0086585 A1 | 4/2005 | Walmsley et al. | |
| 2005/0276440 A1 | 12/2005 | Rhoads et al. | |

FOREIGN PATENT DOCUMENTS

| | | |
|---|---|---|
| EP | 0 953 938 A2 | 11/1999 |
| EP | 935 872 | 11/2001 |
| JP | 2000 41144 A | 2/2000 |
| WO | WO 99/17537 | 4/1999 |
| WO | WO 01/05075 | 1/2001 |
| WO | WO01/24113 | 4/2001 |
| WO | WO01/39121 | 5/2001 |
| WO | WO01/76253 | 10/2001 |
| WO | WO02/03328 | 1/2002 |
| WO | WO02/33650 | 4/2002 |

OTHER PUBLICATIONS

Bender et al., "Techniques for Data Hiding," SPIE vol. 2420, Jan. 1995, pp. 164-173.

Caronni, "Assuring Ownership Rights for Digital Images," Published in the Proceedings of 'Reliable IT Systems,' VIS '95, HH. Brüggemann and W. Gerhardt-Häckl (Ed.), Vieweg Publishing Company, Germany, 1995, Jun. 14, 1994, 10 pages.

Carp, Daniel A., "Seven wonders of the imaging world", International Contact, Oct./Nov. 2000, pp. 36/I-36/IV.

"Digital Watermarking, The Unseen Advantage" Geo Informatics, Jun. 2001 (3 pages).

Friedman, "The Trustworthy Digital Camera: Restoring Credibility to the Photographic Image," IEEE Transactions on Consumer Electronics, vol. 39, No. 4, Nov. 1993, pp. 905-910.

http://web.archive.org/web/20010305033241/http://www.kodak.com/country/US/en/corp/researchDevelopment/technologyFeatures/digitalWatermarking.shtml, "Invisible Watermarking", archive date of Mar. 5, 2001 (4 pages, including Internet Archive Wayback Machine cover page).

Koch et al., "Digital Copyright Labeling: Providing Evidence of Misuse and Tracking Unauthorized Distribution of Copyrighted Materials," OASIS Magazine, Dec. 1995, 3 pages.

Manjunath, "Image Processing in the Alexandria Digital Library Project," Proc. IEEE Int. Form on Research and Tech. Advances in Digital Libraries—ADL '98, pp. 180-187.

Seybold Seminars: Keynote: Digital Imaging Day, comments from panel including Daniel Carp, panel discussion occurring on Aug. 28, 2000 (8 pages).

Yeung et al., "Digital Watermarks: Shedding Light on the Invisible," Nov.-Dec. 1998, IEEE Micro vol. 18, No. 6, pp. 32-41.

Zhao et al., "Embedding Robust Labels Into Images for Copyright Protection," Proc. of the International Congress on Intellectual Property Rights for Specialized Information, Knowledge and New Technologies (Vienna, Austria) Aug. 21-25, 1995, 10 pages.

Zhao, "Digital Watermark Mobile Agents," Proc. of NISSC'99, Arlington, VA, Oct. 18-21, 1999, pp. 138-146.

IBM Research Disclosure, "Universal Interactive Device," Database No. 410129, Jun. 1998, 2 pages.

U.S. Appl. No. 09/452,023, filed Nov. 30, 1999, Rhoads.

Oct. 11, 2006 Supplemental Amendment and Interview Summary; Aug. 11, 2006 Amendment; Aug. 1, 2006 Non-final Office Action, all from assignee's U.S. Appl. No. 11/145,514 (published as US 2005-0276640 A1).

Aug. 30, 2006 Amendment and Aug. 23, 2006 Office Action, each from Assignee's U.S. Appl. No. 10/426,489 (published as US 2004-0046774 A1).

Jan. 5, 2007 Amendment and Oct. 6, 2006 Office Action, each from Assignee's U.S. Appl. No. 10/371,995 (published as US 2003-0215110 A1).

* cited by examiner

FIG. 1

Legend: Fig. 1 illustrates a map, which is divided into areas (A-M). Each area (e.g., area A) preferably includes a digital watermark embedded therein. The digital watermark for area A includes or links to location information associated with area A. Area B also includes a digital watermark embedded therein including or linking to location information associated with area B, and so on.

Legend: Fig. 2 illustrates various components of a watermark reading device 20, according to one embodiment. The device preferably includes a general purpose or dedicated computer, incorporating electronic processing circuitry (e.g., a CPU) 22, memory 24, an interface 26 to an input device 28, an output device 30 (e.g., a display screen, LED indicators, LED arrows, speakers, and/or audio-synthesis chip, etc.), a network connection 32 and a global positioning system (GPS) receiver 34.

DIGITALLY WATERMARKED MAPS AND SIGNS AND RELATED NAVIGATIONAL TOOLS

FIELD OF THE INVENTION

The present invention relates to navigation and map orientation, and is particularly illustrated with reference to maps and signs embedded with digital watermarks.

BACKGROUND AND SUMMARY OF THE INVENTION

A map is both a beloved and bewildering companion to those who choose to navigate an unfamiliar city or traverse across country to find a blissful vacation spot. Map navigation becomes even more difficult for those who retreat into the wilderness, some becoming lost, unable to traverse the unfamiliar terrain with a map.

Countless children, stuffed into the backseats of vacation-bound station wagons, sport utility vehicles and Volkswagen bugs, have pleaded to know if "we are there yet." Befuddled parents search for convincing answers as they unfold yet another map.

In some circles, orienteering and adventure racing rise to the level of competition, drawing crowds of participants and network audiences. Such competitions force participants to navigate through mountains, streams, and deserts, often guided only by a compass and map.

Many young geography students, when presented with a world or area map, struggle to accurately place themselves within a map to determine their relationship to various area or world locations.

Commercial and recreational boats and aircraft often travel through unfamiliar areas and must skillfully navigate in order to reach their intended destinations.

Global positioning systems (GPS) have improved navigation by providing accurate location feedback. As will be appreciated by those skilled in the art, military and civilian water, ground, and airborne vehicles often use GPS systems for navigation. GPS is a satellite-based radio navigation system capable of providing continuous position, velocity, and time information. GPS receiver units receive positioning signals from a constellation of satellites deployed in various orbits about earth (e.g., 12-hour orbits). The satellites continuously emit electronic GPS signals (or telemetry) for reception by ground, airborne, or watercraft receiver units. By receiving GPS signals from a plurality of satellites, a properly configured receiver unit can accurately determine its position in three dimensions (e.g., longitude, latitude, and altitude).

There are many known GPS systems. For example, U.S. Pat. No. 5,990,826 discloses an interbuilding and urban canyon extension solution for global positioning systems.

U.S. Pat. No. 5,861,841 discloses a compact GPS receiver/processor. The GPS system including an antenna to receive Global Positioning System (GPS) signals from two or more GPS satellites and a credit card size GPS signal processing Smartcard. The Smartcard is attached to the antenna that receives the GPS signals and determines and displays the present position of the antenna.

U.S. Pat. No. 5,964,821 discloses a navigation system for offering navigational assistance to a mobile user. The navigation system receives GPS position information signals, which are processed to determine current position latitude and longitude coordinates and direction of travel.

Of course, there are many other GPS systems known to those of ordinary skill in the art.

The present invention employs digital watermarking techniques to even further ease navigation and map orientation. In some embodiments, digital watermarking techniques are combined with GPS systems. Applications of the present invention include implementations in fields such as government work and field reconnaissance, commercial or recreational boating, hiking, mountaineering, travel, orienteering, geography, education, exploration, entertainment, sight seeing, etc.

Digital watermarking, a form of steganography, is the science of encoding physical and electronic objects with plural-bit digital data, in such a manner that the data is essentially hidden from human perception, yet can be recovered by computer analysis. In physical objects, the data may be encoded in the form of surface texturing, or printing. Such marking can be detected from optical scan data, e.g., from a scanner, optical reader, input device, digital camera, or web cam. In electronic objects (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The assignee's U.S. Pat. No. 6,122,403 and U.S. application Ser. No. 09/503,881 (now U.S. Pat. No. 6,614,914) are illustrative of certain watermarking technologies.

Digital watermarking systems typically have two primary components: an encoder that embeds the watermark in a host media signal, and a decoder that detects and reads the embedded watermark from a signal suspected of containing a watermark (e.g., a suspect signal). The encoder embeds a watermark by altering the host media signal. The decoder component analyzes a suspect signal to detect whether a watermark is present. In applications where the watermark encodes information, the decoder extracts this information from the detected watermark.

The analysis of the detected data can be accomplished in various known ways. Presently, most steganographic decoding relies on general purpose microprocessors that are programmed by suitable software instructions to perform the necessary analysis. Other arrangements, such as using dedicated hardware, reprogrammable gate arrays, or other techniques, can of course be used.

Determining orientation of embedded data can be discerned by reference to visual clues. For example, some objects include subliminal graticule data, or other calibration data, steganographically encoded with the embedded data to aid in determining orientation. Others objects can employ overt markings, either placed for that sole purpose (e.g. reference lines or fiducials), or serving another purpose as well (e.g. lines of text), to discern orientation. Edge-detection algorithms can also be employed to deduce the orientation of the object by reference to its edges.

In one example, subliminal graticule data can be sensed to identify the locations within the image data where the binary data is encoded. The nominal luminance of each patch before encoding (e.g., background shading on a map) is slightly increased or decreased to encode a binary "1" or "0." The change is slight enough to be generally imperceptible to human observers, yet statistically detectable from the image data. Preferably, the degree of change is adapted to the character of the underlying image, with relatively greater changes being made in regions where the human eye is less likely to notice them. Each area thus encoded can convey plural bits of data (e.g., 16–256 bits).

One problem that arises in many watermarking applications is that of object or positioning corruption. If the object is reproduced, skewed, or distorted, in some manner such that the content presented for watermark decoding is not identical to the object as originally watermarked, then the decoding process may be unable to recognize and decode the watermark. To deal with such problems, the watermark can convey a reference signal. The reference signal is of such a character as to permit its detection even in the presence of relatively severe distortion. Once found, the attributes of the distorted reference signal can be used to quantify the content's distortion. Watermark decoding can then proceed—informed by information about the particular distortion present.

The assignee's U.S. application Ser. Nos. 09/503,881 (now U.S. Pat. No. 6,614,914) 09/452,023 (now U.S. Pat. No. 6,408,082) detail certain reference signals, and processing methods, that permit such watermark decoding even in the presence of distortion. In some image watermarking embodiments, the reference signal comprises a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

Such watermarking techniques, and many others known to those skilled in the art, may be suitably employed to improve navigation, easy road journeys and enhance education, among other benefits.

The foregoing and other features and advantages of the present invention will be more readily apparent from the following detailed description, which proceeds with reference to the accompanying drawings.

DETAILED DESCRIPTION

Watermark Embedding

In accordance with a first embodiment of the present invention, a map 10 includes plural-bit data steganographically encoded therein. (The term map is used broadly herein and includes, for example, navigational tools and documents, road maps, atlases, wilderness maps, area maps, city maps, tourist maps, location guides, walk or run routes, path-layouts, 3-demensional models, vegetation maps, building maps, structure maps, stadium seating and concert hall locations, park maps, amusement or theme park maps, DEM maps, master maps, topographical maps, globes, relief maps, to name just a few. A map may also include a digitized map for display on a monitor, TV, LCD, etc.). Map 10 can be printed or drawn on any suitable surface including paper, fibers, fabric, wood, plastic, metal, metal-alloys, objects, plaster, laminates, etc., etc. A digitized map image may include plural-bit data steganographically encoded therein.

The encoding of the map can encompass artwork or printing on the map, the map's background, lines on the maps, a laminate layer applied to the map, surface texture, etc. If a photograph, line design, or drawing is present, it too can be encoded. A variety of watermark encoding techniques are detailed in the patent documents discussed herein; artisans in the field know many more.

Figure 1:
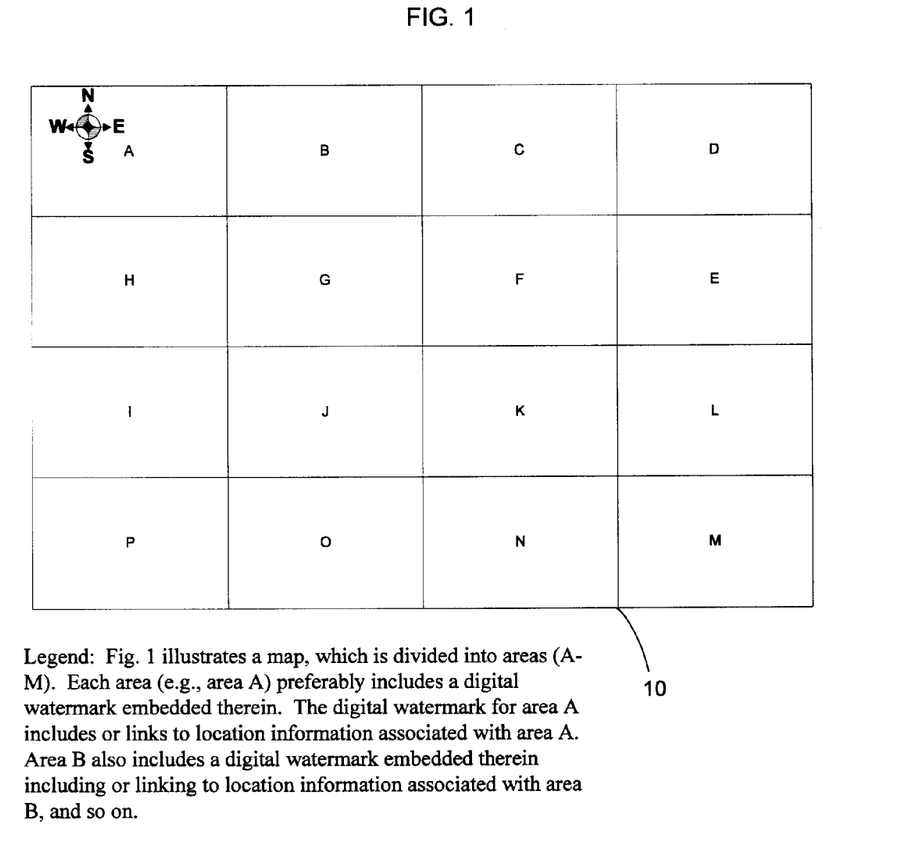
FIG. 1 illustrates a map, which is divided into blocks.

Preferably, map 10 is embedded with a plurality of watermarks. As shown in FIG. 1, map 10 is divided into a plurality of areas A–P (e.g., blocks, patches, or segments, etc.). Of course, the number of blocks or areas can be varied, with enhanced precision resulting from an increased number of blocks. Each area is preferably embedded with at least one watermark. (In one embodiment, each individual block is redundantly embedded with multiple copies of a respective unique watermark—further enhancing the robustness of the map. In another embodiment, some of the blocks are subdivided, with at least one unique watermark embedded in each subdivision.).

A watermark typically includes a payload (e.g., 16–256 bits) that provides area (or location) identifying information. For example, the payload may include the geo-coordinates (e.g., "center lat: N34.4324352, long: W87.2883134; rot from N/S: 3.232;x2.343, y2.340, dx0.123, dy493, etc.") for the center of the area, the coordinates of each area corner or boundary, the area of the boundary, a range of coordinates for the area, coordinates in relation to the overall area depicted by the map, and/or the coordinates for a dominate (or well-known) structure, road, area, etc., within the area block. (For example, area A is embedded with at least one watermark having coordinates corresponding to area A's center or corners, etc.). The payload may simply be a number that is associated with a block location on the map. For example, if a map comprises 32 by 64 watermarked blocks, each block is encoded with a number between 1 and 2048.

Further, the payload may include additional fields, one conveying a map ID and another conveying the block number. The map ID may be used to identify the map as one of a collection of potentially many different maps. To program a map reader (as discussed below) for a particular map in the collection, the user passes the reader over the map to read the map ID (or simply enters the map ID). The reading device is then connected to a database, via a docking station at a personal computer or through a wireless connection. The reading device queries the database with the map ID and the database returns information associated with items of interest on the particular map (such as restaurants, scenic areas, camp sites, etc.) The user then disconnects the reader from the database and is ready to use the map.

In another embodiment, some bits in the watermark payload identify the latitude/longitude of the map origin, while other payload bits identify the coverage extent of the map. Additional payload bits may even identify the offset of a chosen block from the origin. As an alternative, the lat/long and extents could be read from an initialization section, e.g., a map legend, or corner area, etc.

As an alternative, the location information may include an index or identifier, which is used to interrogate a database to find physical coordinates or location information. Upon extraction by a watermark decoder, the index is provided to a database. The decoder may communicate with a database via a network (e.g., wireless network, LAN, WAN, the internet, intranet, etc.). Alternatively, the database may be maintained locally, or stored on a computer readable medium such as a compact disk (CD), magnetic tape, magnetic storage device (disk drive, removable media, floppy disks, etc.), electronic memory circuits, etc. Related information that is stored in the database is indexed via the watermark index.

A grid (or orientation) signal can also be included in the watermark and/or location information. Preferably, the entire map uses the same grid signal, so that all blocks in a map can be used to determined rotation and scale of the map. Such a grid signal may assist in detecting watermarks. (Alternatively, such a grid signal can be used to help orient a map. For example, an orientation signal may be used to designate magnetic North, or another map orientation. Feedback can be supplied to a reader (e.g., watermark decoder) to help orient a watermark reader with respect to a map and the physical surrounding area. As discussed below, a watermark reader may be provided with compass-like functionality to assist with such orientation.).

The watermark may be embedded such that it conveys both orientation and message information. For example, the modifications made to encode message symbols may be made in a manner that creates a recognizable pattern, such as a known array of peaks in a particular transform domain, such as the autocorrelation domain, the Fourier domain, or some other transform domain. One approach is to embed the message symbols by modulating a carrier signal with autocorrelation properties that form peaks in the autocorrelation domain. In particular, by performing an autocorrelation of an image captured of the watermarked map, the watermark detector generates peaks that can be compared with an expected pattern of peaks attributable to the carrier signal. The detector then performs pattern matching with the peaks to determine the scale and rotation of the captured image relative to the watermarked map. Another approach is to use peaks in a particular transform domain (such as the Fourier domain) for both orientation and message information. In this approach, the watermark is represented as collection of N possible peaks at particular locations in the Fourier magnitude domain. The detector first identifies some subset of the N peaks to determine orientation, and then determines message information by identifying the presence or absence of peaks at predetermined locations.

In one embodiment, each block on a map has a similar payload structure, e.g., each including the same grid signal and perhaps the coverage area of the map (e.g., latitude/longitude, range of coordinates, etc., of the map.). The remaining payload bits would then be used to identify the individual areas (e.g., blocks A–P) on a map 10.

Phase-correlation can be employed to even further improve the location resolution within a map block. Once the detector has determined the rotation and scale of the captured image relative to the watermarked map, it can realign the captured image using these rotation and scale parameters. The watermarked block locations can then be detected by using the known phase attributes of the watermark signal and correlating these known attributes with the realigned, captured image. These block locations then serve as reference points for decoding watermark message data from a particular block. Also, in one embodiment, resolution down to a pixel within a block is achieved once rotation and scale are resolved.

Watermark Reading Device

A watermark reading device can take various forms. Preferable among such forms is a handheld reading device 20. (With reference to FIG. 2, a hand-held device 20 may allow better placement of the device in close proximity to map 10, or sections of map 10 itself, permitting precision navigation. A hand-held reading device 20 is typically portable—an advantageous feature for outdoor and wilderness applications.). Examples of such hand-held device 20 include stand alone hardware implantations, portable computing devices, personal digital assistants (PDAs), portable devices such as those manufactured by Compaq (e.g., the iPac line) and Handspring, cellular and satellite phones, smart pens and watches, etc.

Figure 2:
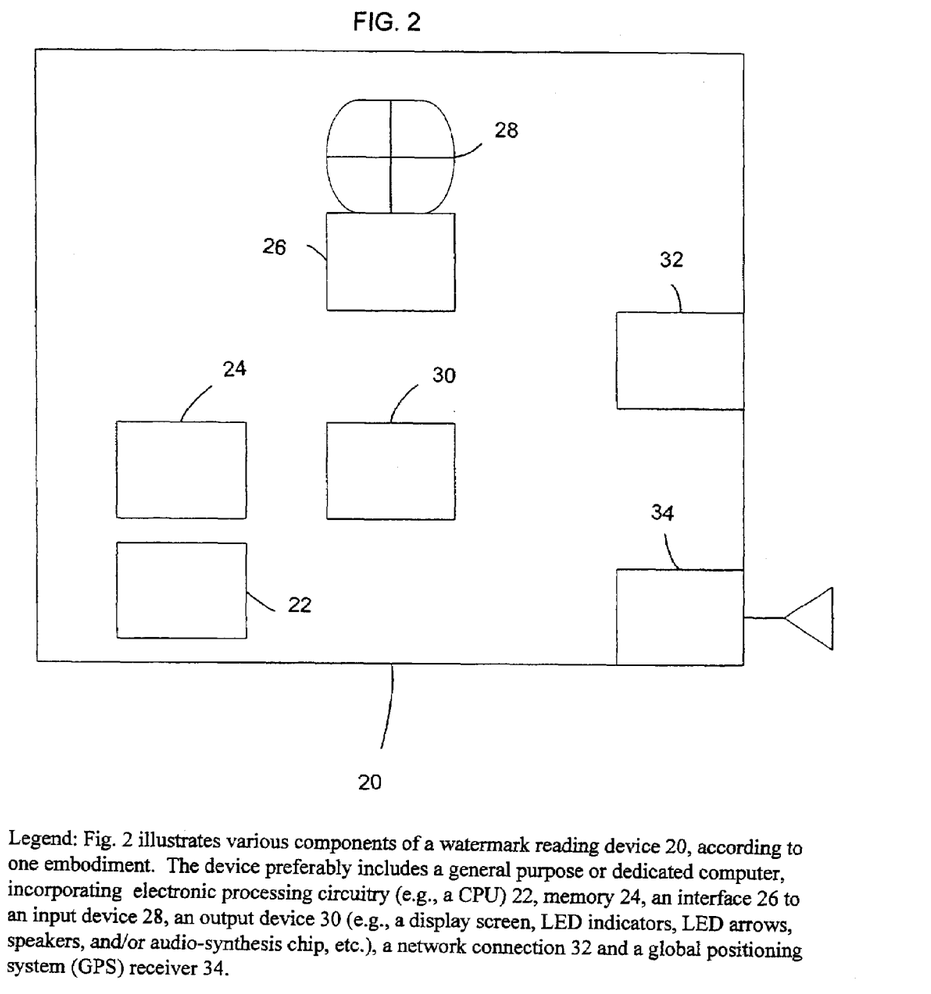
FIG. 2 illustrates various components of a watermark reading device.

A handheld reading device 20 preferably includes a general purpose or dedicated computer, incorporating electronic processing circuitry (e.g., a CPU) 22, memory 24, an interface 26 to an input device 28, an output device 30 (e.g., a display screen, LED indicators, LED arrows, speakers, and/or audio-synthesis chip, etc.), and optionally a network connection 32. (Of course, interface 26 may be integrated with other device 20 circuitry, particularly if input device 28 is built onboard device 20. Also device 20 preferably includes sufficient bus or other structure to facility electronic signal communication between the various device components, where needed.). The network connection 32 can be used to connect, through a wireless or satellite connection to a network (e.g., intranet, internet, LAN, WAN, etc.). In one embodiment the input device (or reading device 20) is tethered to a desktop or laptop computer. A network connection is achieved via the connected computer. Preferably, a handheld reading device includes (or, alternatively, is in communication with) a global positioning system receiver 34. As will be appreciated by one of ordinary skill in the art, suitable software programming instructions executing via CPU 22 can be used to effect various types of functionality (including watermark detection and reading) as discussed herein.

The handheld reading device 20 includes (or is in communication with) an input device 28. The input device 28 may include an optical reader, an imaging mouse, a digital camera, a laser or pen scanner, a digital eye module, etc. Digital eye modules (such as those provided by LightSurf, Inc.) typically include features such as a complete camera on a chip, CMOS imaging sensor, miniaturized lens and imaging software. Other imaging devices include a CCD image sensor. Of course, input devices can be packaged in variety of forms to suit particular applications. (In one embodiment, an input device 28 is tethered to a personal computer having watermark decoding software executing therein.).

The handheld reading device 20 may include additional features to improve reading and facilitate accurate placement of the device 20 on map 10. For example, the input device 28 may optionally include a targeting guide, such as a cross-hair-like viewer (or other visual indicator). A targeting guide helps achieve precise placement of the input device 28 on the map 10. The area within the cross-hairs (or targeting guide) preferably corresponds with the area captured by the input device. (Alternatively, the area within the cross-hairs could also be a known offset from the area captured by the input device. Watermark rotation and scale information could be used to determine actual location.). In another embodiment, a see-through window is provided to locate and target an exact map location. (Of course, the input device 28 may employ a beam-splitter or reflective lens to ensure that the viewed area is the same as that captured by the input device 28.). The viewable window area corresponds with that captured by the input device 28. In still another embodiment, a camera-pen or laser-pointer allows a user to pin-point a map location, which is scanned (e.g., image capture).

User Applications

Figure 3:
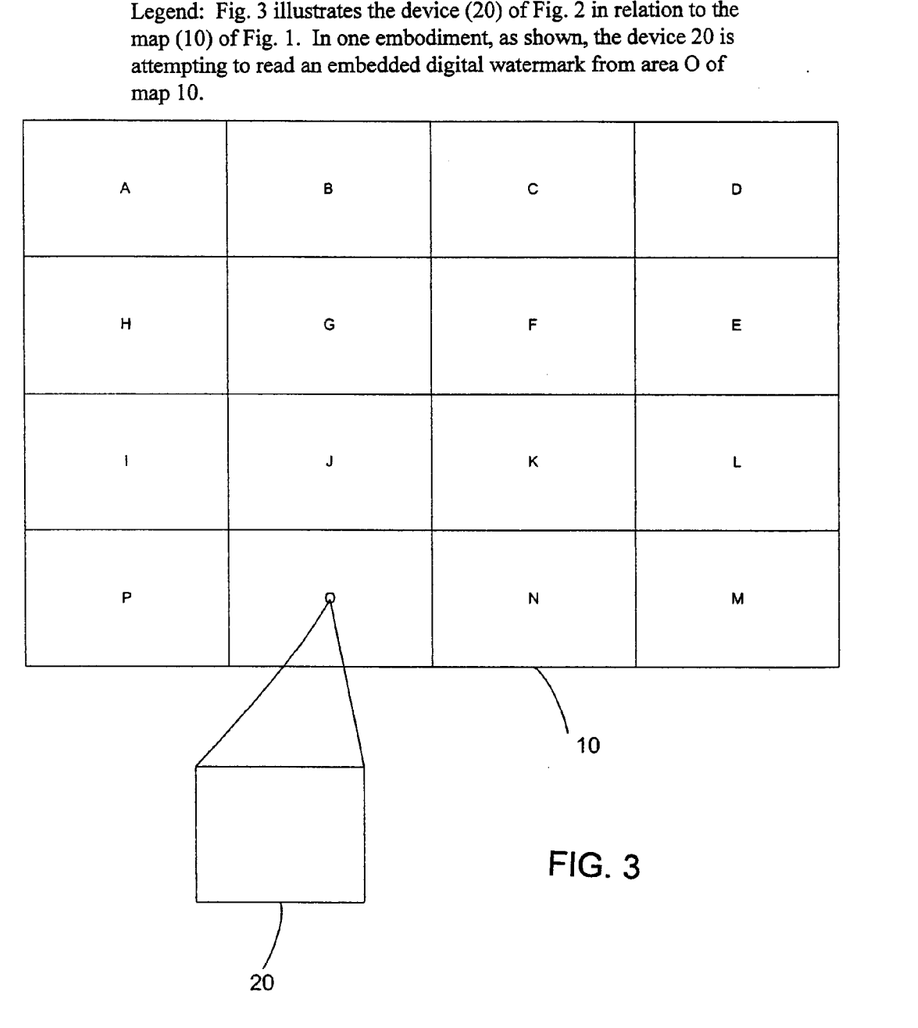
FIG. 3 illustrates the device of FIG. 2 in relation to the map of FIG. 1.

A typical application of the present invention involves a map user placing a handheld reading device 20 (or an associated input device 28) near or on a map 10 (FIG. 3). (Of course, FIG. 3 is not intended to limit the size relationship between the map 10 and device 20). The input device 28 reads a map area (e.g., area O, or a sub-area within area O), which preferably includes an embedded watermark. The input device provides an output signal (e.g., representing the captured map area) to the handheld reading device 20. Decoding software running on the handheld device 20 identifies a watermark (if present) from the signal and extracts the embedded location information from the watermark. In one embodiment, map location feedback is presented to the user via the reader device's output (e.g., an audio signal, a text display). The user is then able to compare the map coordinates to coordinates taken from a GPS receiver.

Figure 4:
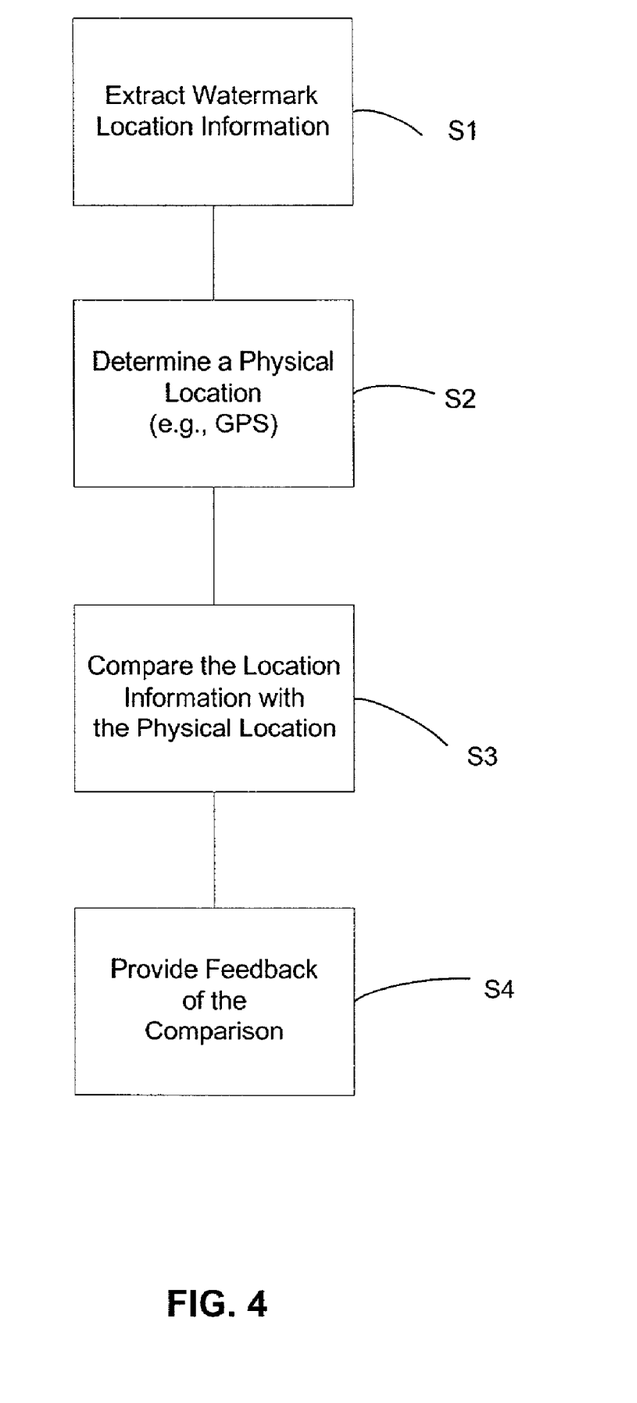
FIG. 4 is a flow diagram illustrating a method according to the present invention.

In the preferred embodiment, the handheld reading device 20 includes (or is in communication with) a GPS receiver 34. Location information is extracted from a watermark (step S1, FIG. 4). The current, physical location of the handheld reading device 20 is determined via the GPS receiver (Step S2). In step 3, the handheld reading device 20 compares (and/or correlates) its physical location to the map location scanned by the input device 28. (Of course, such correlation may be realized by software computational instructions and/or with database/table look-up.). The map user is presented with appropriate corrective feedback, if needed (Step S4). For example, in one embodiment, the handheld reading device 20 may prompt the user to move the input device 28 (or reading device 20) to a map location, which corresponds with the actual physical location of the handheld reading device 20. (In one embodiment, the prompting is by a visual indicator (e.g., arrows or LEDs) indicating the direction in which the device must be moved. In another embodiment, an audio indication is presented, for example, such as "move six inches to the left and one inch down," or "move to grid number E8." In still another embodiment, a display screen displays a digitized replica of the map, or a portion of the map, and displays both the current physical location and the map location scanned by the input device. In still another embodiment, the output device indicates when the input device is properly located on the map with respect to the user's current physical location.).

In another embodiment, the watermark's encoded data includes identification of a map's grid system. The reading device 20 correlates (e.g., via formula or table/database look-up) the grid system to the GPS coordinate system and conveys to a user her current map grid location (e.g., tells her that she is currently located in grid F-9).

Consider the following examples to even further illustrate the many possible applications of the present invention.

A map user is examining a map of the Western United States of America while personally (e.g., physically) being located in Boise, Id. The map user places the input device 28 so as to scan a location near Tualatin, Oreg. The handheld reading device 20 can convey (e.g., via the output device 30) to the user to move the input device 28 East and South, until the input device 28 corresponds with the user's physical location in Boise. (GPS coordinates can help to facilitate such functionality.). In this way, the user can identify her present location with respect to the map. Alternatively, as in another embodiment, the output device 30 can indicate that the user must travel West and North to reach the scanned location near Tualatin. In still a further alternative, particularly if an index or code is embedded in the watermark, additional data can be provided to the user. To illustrate, the index is used to interrogate a networked (or local) database. Information, e.g., directions, preferred routes or roads, mileage between the current physical location and the scanned location, dining or tourist information, etc., is provided to the handheld reading device for presentation to the user.

As a further example, a user is going on a trip and obtains watermarked maps (e.g., from a store, service provider, etc.). The maps are indexed by a MAP ID in a database, which can receive current information (e.g., promotions) from hotels, resorts, restaurants etc. The information can be downloaded, streamed, or stored in media (e.g., CD-ROM, electronic or magnetic media, etc.). The database may be maintained by the handheld reading device or may simply be queried via a communication channel. As the user travels, she can place her handheld reading device over various spots on the map to extract corresponding watermarks. The watermarks are then used to index the database to retrieve the downloaded information regarding hotels, resorts, etc. Hence, the watermarked map provides the user with information for places on the map just by passing the handheld reading device 20 over the map. (In contrast, database-linked GPS systems typically require the user to be in a particular location to get such information about that location.). In another example, a user enters (e.g., alphanumerical values via keypad entry or scanning the area on the watermarked map) a map location of a desired destination. The reading device determines the present location (e.g., via a GPS receiver) and provides feedback to the user. In one embodiment, the feedback is a visual indication (e.g., arrows, LEDs, text directions, grid map coordinates, visual display, etc.) of how to move the handheld device to locate the destination point, from the current location. In another embodiment, the feedback is a print out (or display) of travel directions (or map grid numbers) from the current location to the scanned, destination location. In another embodiment, the handheld device includes a known laser pointer and sensing array. Once the destination location is selected, the laser pointer points (e.g., traces) a direction from the current location to the scanned, destination location, based on the positioning of the pointer as determined by the sensing array.

Now consider a potential life-saving example in which a hiker becomes lost in the mountains. The hiker presents a watermarked map to her handheld reading device 20.

The associated input device 28 scans a location on the map. The reading device then gives feedback (e.g., audio, visual, text, etc.) to the hiker to reposition the input device 28 (or the reading device 20) on the map to correspond with her present physical location with respect to the mountains. The hiker can then immediately identify where she is with respect to the map. (Of course, the handheld reading device 20 may include compass-like functionality, common in some GPS receivers. Such functionality is helpful to orient a map with respect to physical surroundings, e.g., to align the maps N/S reference orientation with the environmental conditions.).

Embedding Map Boundaries

A watermark may also include (or reference) information regarding the map within which it is embedded. For example, the watermark may include a range (or boundaries) of coordinates, which define the map 10. The handheld reading device 20 may then determine (e.g., calculate based on the GPS coordinates or via a table look-up) if the user's present, GPS-determined location is viewable on the map 10. The user can be prompted by the device 20 to change maps when her present location is not viewable on the scanned map. In some cases, the handheld reading device may prompt (e.g., via an audible signal, text or graphic, etc.) the user to scan a specific map. This functionality is realized particularly well with the aid of additional information, such as that stored in a database. For example an atlas or an interconnected series of maps can be stored according to their corresponding coordinates (or a range of coordinates). When the watermark index does not match the present physical location (or fails to fall within the boundaries of the map), the user is prompted to select another map. If a particular set of maps is pre-programmed, e.g., preloaded onto the device, stored via CD, or via a specific on-line database, an appropriate map ID or map number (or even map name) corresponding to the scanned coordinates can be presented to the user.

Road Signs and Tourist Information

Street (or road) signs may also be digitally watermarked as discussed above with respect to objects. Consider the implications of such. An automobile is equipped with a watermark decoder (e.g., an input device such as an optical reader, digital camera, laser reader, etc. and watermark detecting and decoding software). In one embodiment, the input device is configured with magnification enhancements, such as a zoom lens, signal amplifier, etc., to allow capture of road sign images from a far. The captured images (or corresponding signals) are input for analysis by the decoding software. The watermark payload is used to convey related information.

For example, a speed limit sign may include a watermark having a corresponding speed message embedded therein. For example, upon decoding the watermark, the read device 20 signals (or itself enables) an audio message to announce the speed limit. To achieve such functionality, the payload may include an index that is used to retrieve an audio or wave file. The wave file could be played via a media player (and output device, e.g., car stereo system), or passed through a digital-to-analog converter and piped through the car's stereo system. Alternatively, the payload itself may include enough information to be converted into an audio message.

In another example, the watermark includes an index that is used to interrogate a database. The database may be stored locally in the automobile, or may be accessed via a wireless network. A corresponding data record is found and returned. The returned data record may include a wide variety of information and data. To illustrate, the return information may include data about upcoming rest stops, tourist attractions, motels (and vacancy in such), speed limits, restaurants, location data, etc. A mobile traveler, upon receipt of such information, may even make a reservation at a motel via a link provided in the return information.

Consider also watermarking tourist, restaurant, convenience and regulatory signs. These too can be embedded with plural-bit data. A compliant reader extracts embedded information to facilitate the retrieval of additional data regarding the sign. (The term "compliant" in this context implies that the device is able to detect and decode watermarks.). An embedded index or identifier is communicated to a database to index related information (e.g., the database may be maintained in a CD-ROM, electronic or magnetic memory residing locally in the automobile, or may be an on-line database accessed via a wireless connection. In an online database embodiment, a web browser may be installed on a compliant device, e.g., a general purpose computer, to help handle the transfer of information, e.g., HTML code, wave files, data files, etc.). Upon receipt of the related data, a traveler may access related data such as menus and prices of local restaurants, vacancies, gas prices, hours of operation, directions and maps, local attractions, etc., etc. (The functionality and systems for linking an identifier to additional data is even further described in assignee's U.S. patent application Ser. No. 09/571,422, filed May 15, 2000.).

Signs at (or maps and photographs of) theme parks, sporting stadiums, concert halls, event centers, convention centers, zoos, office buildings, government buildings, manufacturing plants, universities, shopping malls, parks, schools, museums, etc., etc., may be similarly digitally watermarked. A handheld reading device may be used to coordinate a participant's location with respect to a map and to gather related information as discussed above.

CONCLUSION

The foregoing are just exemplary implementations of navigational aids using digital watermarking technology. It will be recognized that there are a great number of variations on these basic themes. The foregoing illustrates but a few applications of the detailed technology. There are many others.

While this application discusses a handheld reading device, the present invention is not so limited. Of course, an input device may be tethered to a desktop or laptop computer or compliant kiosk. The input device may also communicate with the computer via a wireless channel.

To provide a comprehensive disclosure without unduly lengthening this specification, the above-mentioned patents and patent applications are hereby incorporated by reference. The particular combinations of elements and features in the above-detailed embodiments are exemplary only; the interchanging and substitution of these teachings with other teachings in this application and the incorporated-by-reference patents/applications are also contemplated.

The above-described methods and functionality can be facilitated with computer executable software stored on computer readable mediums, such as electronic memory circuits, RAM, ROM, magnetic media, optical media, removable media, etc. Such software may be stored on a handheld reading device.

The section headings in this application (e.g., "Watermark Reading Device") are provided merely for the reader's convenience, and provide no substantive limitations. Of course, the disclosure under one section heading may be readily combined with the disclosure in that of another heading.

As an alternative, a handheld device (or an input device) may scan a map area to capture embedded data. The handheld device wirelessly communicates the captured data to a networked computer. The computer decodes the captured data (e.g., data including a watermark). The computer can then access networked information via the decoded watermark. The data can be wirelessly communicated to the handheld device for display or may even be communicated to a separated device for display.

Also, whereas the figures illustrate the map areas as rectangular-shaped, the invention is not so limited. Indeed, other area shapes may be advantageously employed. As a further alternative, individual map locations are watermarked, instead of watermarking individual blocks. For example, on a state map, all city locations are watermarked according to respective locations. In a city, streets and building locations are watermarked. In another example, areas corresponding to roads, streams, attractions can also be watermarked.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. An apparatus to read digital watermarks embedded within a map, the map being divided into a plurality of areas, with each area comprising at least one embedded digital watermark including location information for the respective map area, said apparatus comprising:
   a global positioning system receiver to determine a location of said apparatus;
   an input device to capture an image of at least a portion of the respective map area;
   memory including executable software instructions stored therein, the instructions to extract the location information from the at least one embedded digital watermark from the captured image of at least a portion of the respective map area, and to correlate the location of the apparatus with the extracted location information;
   electronic processing circuitry to execute the software instructions; and
   an output device to indicate the correlation of the apparatus location and the captured watermark location information.

2. The apparatus according to claim 1, wherein said apparatus is a handheld apparatus.

3. The apparatus according to claim 1, wherein the output device provides at least one of an LED indication, arrow indication, audio indication, grid indication,or visual display.

4. A method of providing a representation of a geographical area comprising:
   dividing a representation of a geographical area into a plurality of areas; and
   steganographically encoding plural-bit location data within each of the plurality of areas, the location data is unique per each of the plurality of areas, the steganographic encoding varying values representing at least some data associated with a first area of the plurality of areas and at least some data associated with a second area of the plurality of areas.

5. A method of navigating with a map embedded with digital watermarks comprising:
   machine-reading steganographic indicia from optical scan data representing the map, the steganographic indicia including location information which uniquely identifies the map in which the steganographic indicia is embedded in;
   comparing the location information to a physical location; and
   providing feedback to correlate the location information and the physical location.

6. A method of correlating a physical location to a map location, the map being divided into a plurality of areas, with each area comprising at least one embedded digital watermark including location information for the respective area, the method comprising:
   extracting the location information from the watermark at the map location;
   comparing the extracted location information to global positioning system (GPS) received coordinates of the physical location; and
   providing feedback based on the comparison of the physical location and the map location.

7. The method according to claim 6, wherein the location information comprises an index, and said method further comprises indexing a database with the index to identify location information.

8. An apparatus to read digital watermarks embedded within a map, the map being divided into a plurality of areas, with each area comprising at least one embedded digital watermark including location information for the respective map area, said apparatus comprising:
   a global positioning system that determines a location of said apparatus;
   an input to receive optical scan data corresponding to at least a portion of the respective map area;
   memory including executable software instructions stored therein, the instructions to extract location information from the optical scan data of at least a portion of the respective map area, and to correlate the location of the apparatus with the extracted location information;
   electronic processing circuitry to process the software instructions; and
   an output to indicate a correlation of the apparatus location and the watermark location information.

9. A method comprising:
   inputting a map location to a computing device, wherein the map includes a plurality of digital watermarks embedded therein, and wherein said inputting a map location to a computer device comprises reading at least one of the plurality of digital watermarks, the watermark comprising the map location;
   determining a current location;
   in the computing device, determining a relationship between the input map location and the current location; and
   providing directions from the current location to the map location.

10. The method of claim 9, wherein said determining a current location comprises receiving GPS signals to determine the current location.

* * * * *